(12) United States Patent
Furuya et al.

(10) Patent No.: US 7,136,956 B2
(45) Date of Patent: Nov. 14, 2006

(54) SEMICONDUCTOR DEVICE (75) Inventors: Kenji Furuya, Kawasaki (JP);
Hirokazu Kanma, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 370 days.

(21) Appl. No.: 10/090,822

(22) Filed: Mar. 6, 2002

(65) Prior Publication Data

US 2003/0049897 A1 Mar. 13, 2003

(30) Foreign Application Priority Data

Sep. 13, 2001 (JP) ............................. 2001-278603

(51) Int. Cl.
*G06F 13/00* (2006.01)

(52) U.S. Cl. ...................... 710/316; 710/306; 710/311; 710/313

(58) Field of Classification Search ................ 710/300, 710/305–317
See application file for complete search history.

(56) References Cited

U.S. PATENT DOCUMENTS 5,862,359 A 1/1999 Nozuyama 6,662,256 B1* 12/2003 Foo ............................. 710/305
6,662,260 B1* 12/2003 Wertheim et al. ........... 710/316

FOREIGN PATENT DOCUMENTS

JP 9-218734 8/1997

* cited by examiner

*Primary Examiner*—Khanh Dang
(74) *Attorney, Agent, or Firm*—Staas & Halsey LLP (57) ABSTRACT A semiconductor device includes: a plurality of function blocks; a plurality of buses, each of which is respectively connected to one of the plurality of function blocks; a plurality of control signal lines, each of which is respectively connected to one of the plurality of function blocks; a main bus; a bus control unit connected to the main bus; a bus division control unit located between the plurality of buses and the main bus, for connecting one of the plurality of buses to the main bus and transmitting a control signal to a corresponding one of the plurality of control signal lines in accordance with a decoded result of information supplied from the bus control unit via the main bus, thereby controlling a corresponding one of the plurality of function blocks.

11 Claims, 6 Drawing Sheets

SEMICONDUCTOR DEVICE

BACKGROUND OF THE INVENTION

The present invention generally relates to semiconductor devices, and, more particularly, to a semiconductor device that includes a plurality of function blocks, and address and data buses connected to the function blocks.

As electronic devices are expected to have a larger variety of functions, there is an increasing demand for semiconductor devices having more functions and greater expandability. In an attempt to realize this, a large number of function blocks are connected to a single bus in a semiconductor device of the prior art, and each control operation for each corresponding function block is performed through the single bus.

Figure 1:
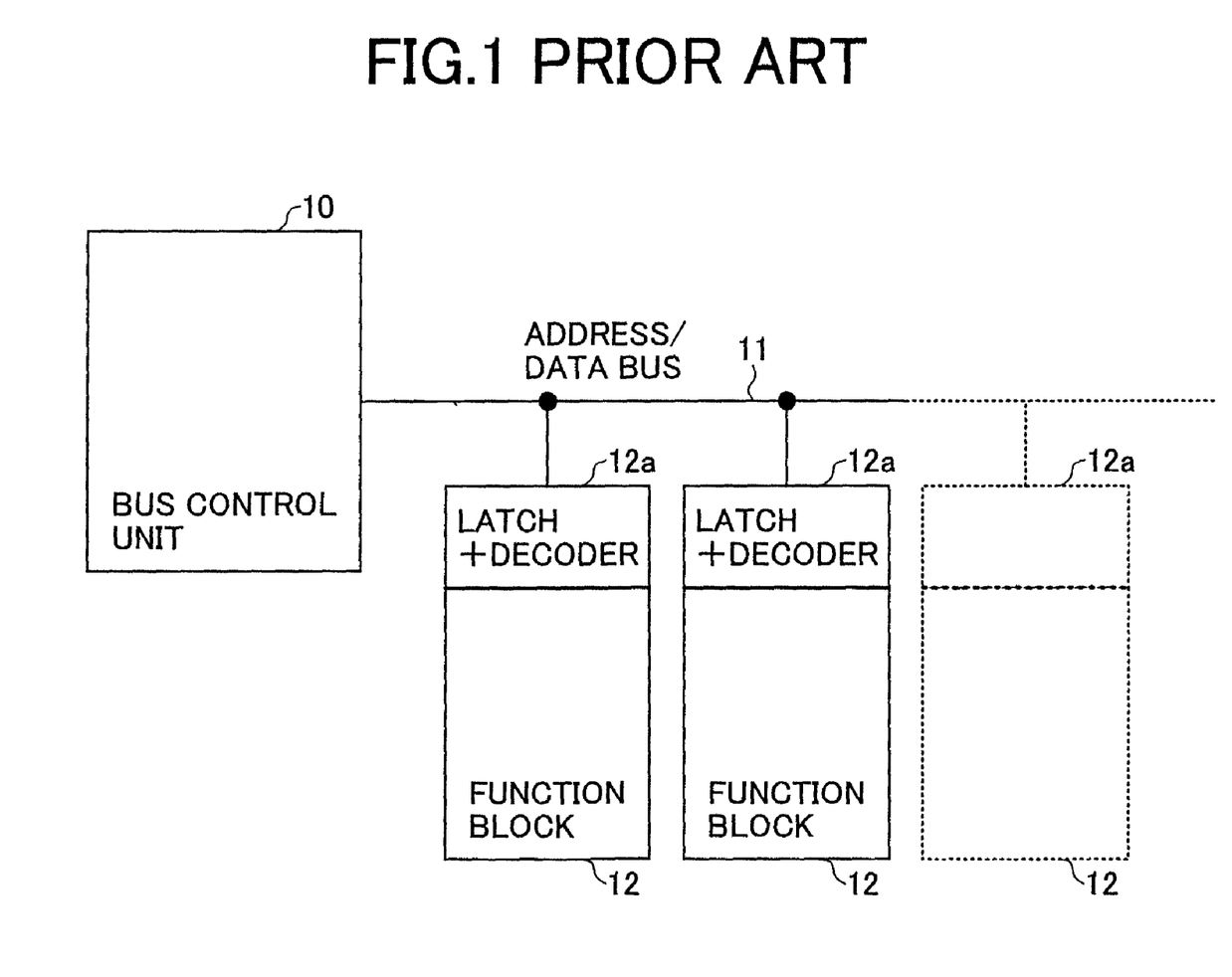
FIG. 1 shows the structure of a conventional semiconductor device.

FIG. 1 shows the structure of a conventional semiconductor device. As shown in FIG. 1, the conventional semiconductor device includes a bus control unit 10, an address/data bus 11, and a plurality of function blocks 12. The bus control unit 10 serves as a control unit such as a CPU that controls the function blocks 12 via the address/data bus 11. In the address space that is controlled by the bus control unit 10, each function block 12 is allocated to each corresponding address area. When the bus control unit 10 accesses an address area, the corresponding function block 12 performs a predetermined control operation. Each function block 12 is provided with a latch/decoder unit 12a that latches and decodes an address transmitted via the address/data bus 11, and determines whether the access is intended for the corresponding function block 12.

As described above, the conventional semiconductor device has the function blocks 12 connected directly to the address/data bus 11, so that the latch/decoder unit 12A of each function block 12 can determine whether each access is intended for each corresponding function block 12.

In this structure, as the number of function blocks 12 increases, the load on the address/data bus 11 also increases. Since there is only one address/data bus in this structure, a large number of function blocks 12 will cause a problem of a large load on the address/data bus 11. To avoid such a problem, the semiconductor device needs to be equipped with a bus driver that exhibits sufficiently high driving performance for a large number of function blocks 12.

Furthermore, to connect a large number of function blocks 12 to the single address/data bus 11, a large number of latch/decoder units 12a having identical structures are required, and this results in an increase in circuit size. Also, the greater wire length causes wiring delay, which hinders high-speed operations and results in larger electric power consumption and frequent noise.

Also, since the function blocks 12 are connected to the single address/data bus 11, one access operation is effective only for one of the function blocks 12. For instance, a transferring operation between two of the function blocks 12 requires two cycles by the bus control unit 10, with one of the two cycles being a read cycle for one of the two function blocks 12, and the other one of the two cycles being a write cycle for the other one of the two function blocks 12. During these two cycles, the address/data bus 11 is continuously occupied. While the address/data bus 11 is thus occupied, no accesses can be made to another function block 12, and no data can be transferred between another two function blocks 12. Apparently, the fact that one transferring operation requires two cycles hinders improvement of the semiconductor device.

SUMMARY OF THE INVENTION

A general object of the present invention is to provide semiconductor devices in which the above disadvantages are eliminated.

A more specific object of the present invention is to provide a semiconductor device that can effectively control a plurality of function blocks via address and data buses.

The above objects of the present invention are achieved by a semiconductor device that includes: a plurality of function blocks; a plurality of buses, each of which is respectively connected to one of the plurality of function blocks; a plurality of control signal lines, each of which is respectively connected to one of the plurality of function blocks; a main bus; a bus control unit connected to the main bus; a bus division control unit located between the plurality of buses and the main bus, for connecting one of the plurality of buses to the main bus and transmitting a control signal to a corresponding one of the plurality of control signal lines in accordance with a decoded result of information supplied from the bus control unit via the main bus, thereby controlling a corresponding one of the plurality of function blocks.

In the above structure, the address latch/decoder circuits are put together in the bus division control unit, while each of the plurality of address data buses is respectively allocated to one of the function blocks. These changes to the structure reduce the circuit size, the load on each bus, electric power consumption, and noise.

In the above structure, at least two of the function blocks may share one of the buses, and the bus division control unit may control a transferring operation between the two function blocks via the shared one of the buses in response to a transfer request signal.

Since the buses are respectively allocated to the function blocks in this structure, a data transferring operation between the two function blocks can be performed via a vacant bus. At this point, a write signal and a read signal are simultaneously supplied to the function blocks of the transfer origin and the transfer destination, respectively. By doing so, a transferring operation can be performed with a one-time access, and, as a result, the data transferring rate and efficiency can be dramatically increased.

The above objects of the present invention are also achieved by a semiconductor device that includes: a plurality of buses; a main bus; and a bus division control unit located between the plurality of buses and the main bus, for connecting a first bus of the plurality of buses to the main bus in accordance with a decoded result of information on the main bus, and controlling a transferring operation between two function blocks connected to a second bus of the plurality of buses.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 2:
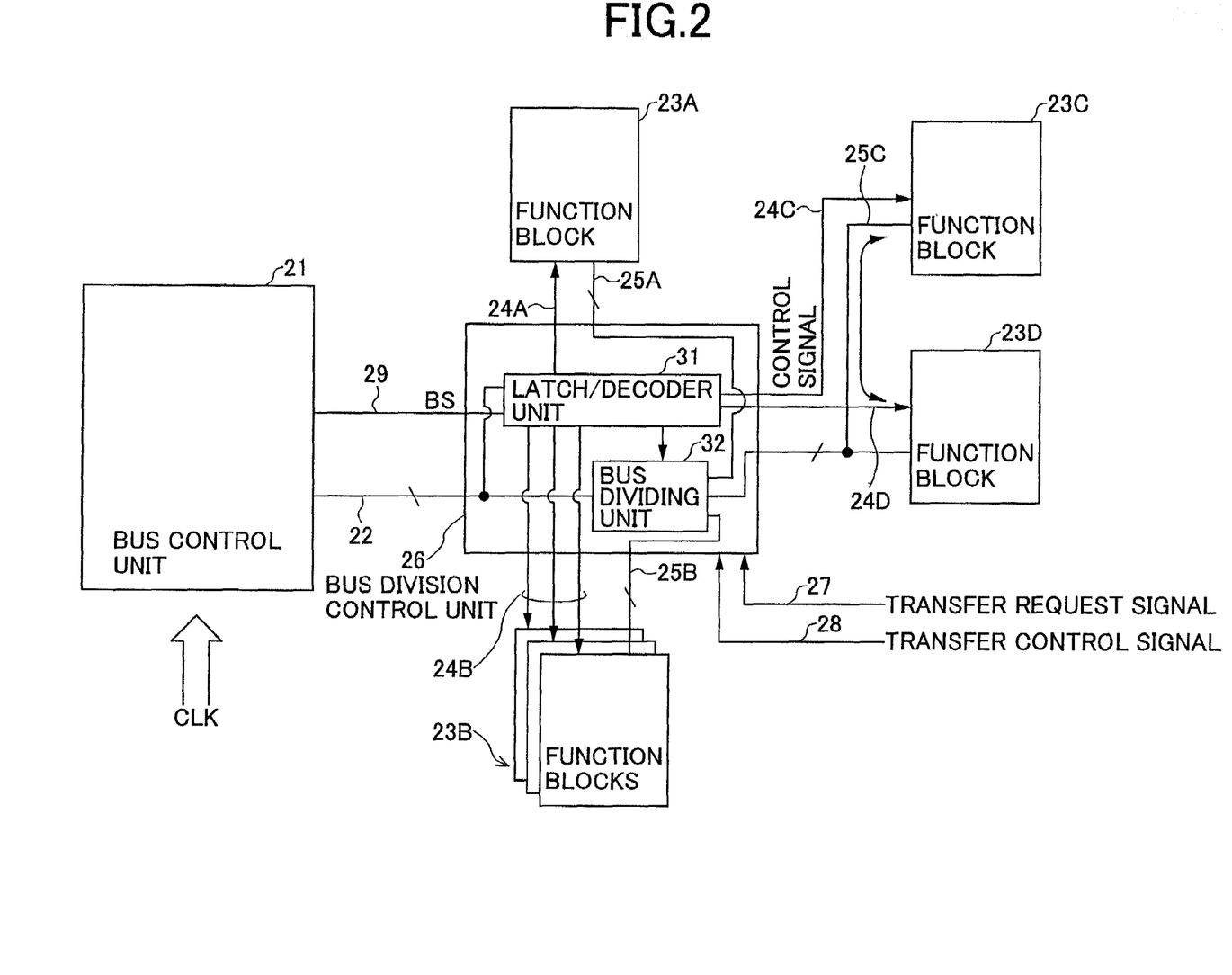
FIG. 2 is a block diagram of the structure of a semiconductor device of the present invention.

FIG. 2 is a block diagram showing the structure of a semiconductor device of the present invention. This semiconductor device includes a bus control unit 21, an address/data bus 22, function blocks 23A through 23D, a control signal line 24A directed to the function block 23A, control signal lines 24B directed to the function blocks 23B, a control signal line 24C directed to the function block 23C, a control signal line 24D directed to the function block 23D, a data bus 25A directed to the function block 23A, a data bus 25B directed to the function blocks 23B, a data bus 25C directed to the function blocks 23C and 23D, a bus division control unit 26, a transfer request signal line 27, a transfer control signal line 28, and a control signal line 29 for the address/data bus 22. The bus division control unit 26 includes a latch/decoder unit 31 and a bus dividing unit 32. Although the unit denoted by reference numeral 23B is shown as a plurality of function units in FIG. 2, this unit may be a single unit.

The latch/decoder unit 31 of the bus division control unit 26 latches an address signal transmitted from the bus control unit 21 via the address/data bus 22, and then decodes the latched address. In accordance with the decoded result from the latch/decoder unit 31, the bus dividing unit 32 of the bus division control unit 26 selects one function block from the function blocks 23A through 23D to be connected to the bus division control unit 26. The bus dividing unit 32 then connects the address/data bus 22 to the one of the data buses 25A through 25C that corresponds to the selected function block. The latch/decoder unit 31 generates a control signal for controlling the selected function block and data bus, also based on the decoded result of the latched address. This control signal is then sent to the control signal lines 24A through 24D.

In this structure shown in FIG. 2, the loads on the address/data bus 22 and on the data buses 25A through 25C become smaller than the load on the single address/data bus in the prior art. The smaller load on individual buses enables a high-speed operation, and allows a smaller bus driver to be employed for driving each bus with smaller electric power consumption than in the prior art. Also, the signal latch/decoder unit 31, which is equivalent to the latch/decoder circuits provided for each of the corresponding function blocks in the prior art, contributes to a smaller circuit size.

In the structure shown in FIG. 2, data can be transferred between the function blocks 23C and 23D, independently of the other parts. To achieve this independent data transfer, a transfer request signal and a transfer control signal are supplied to the bus division control unit 26 via the transfer request signal line 27 and the transfer control signal line 28 respectively. The transfer request signal is a signal for requesting a transfer operation, and the transfer control signal controls the transfer direction between the function blocks 23C and 23D. In accordance with the transfer request signal and the transfer control signal, the bus division control unit 26 separates the function blocks 23C and 23D from the address/data bus 22, and sends the transfer control signal to the function blocks 23C and 23D through the control signal lines 24C, 24D, respectively. By doing so, the independent transfer operation can be performed between the function blocks 23C and 23D, without affecting other operations performed through the data buses 25A and 25B.

With the address latch/decoder unit 31 that is a single unit and separable address/data buses for the function blocks, the entire circuit size can be reduced. Also, the load on the buses, the electric power consumption, and noise occurrences can be all reduced. Furthermore, since the buses are divided among the function blocks, data transfer can be performed between two function blocks via unoccupied buses. When data is transferred, a write signal and a read signal are simultaneously transmitted to the sender function block and the recipient function block, respectively, in accordance with the transfer request signal and the transfer control signal. In this manner, a data transfer operation can be completed by only one access.

Figure 3:
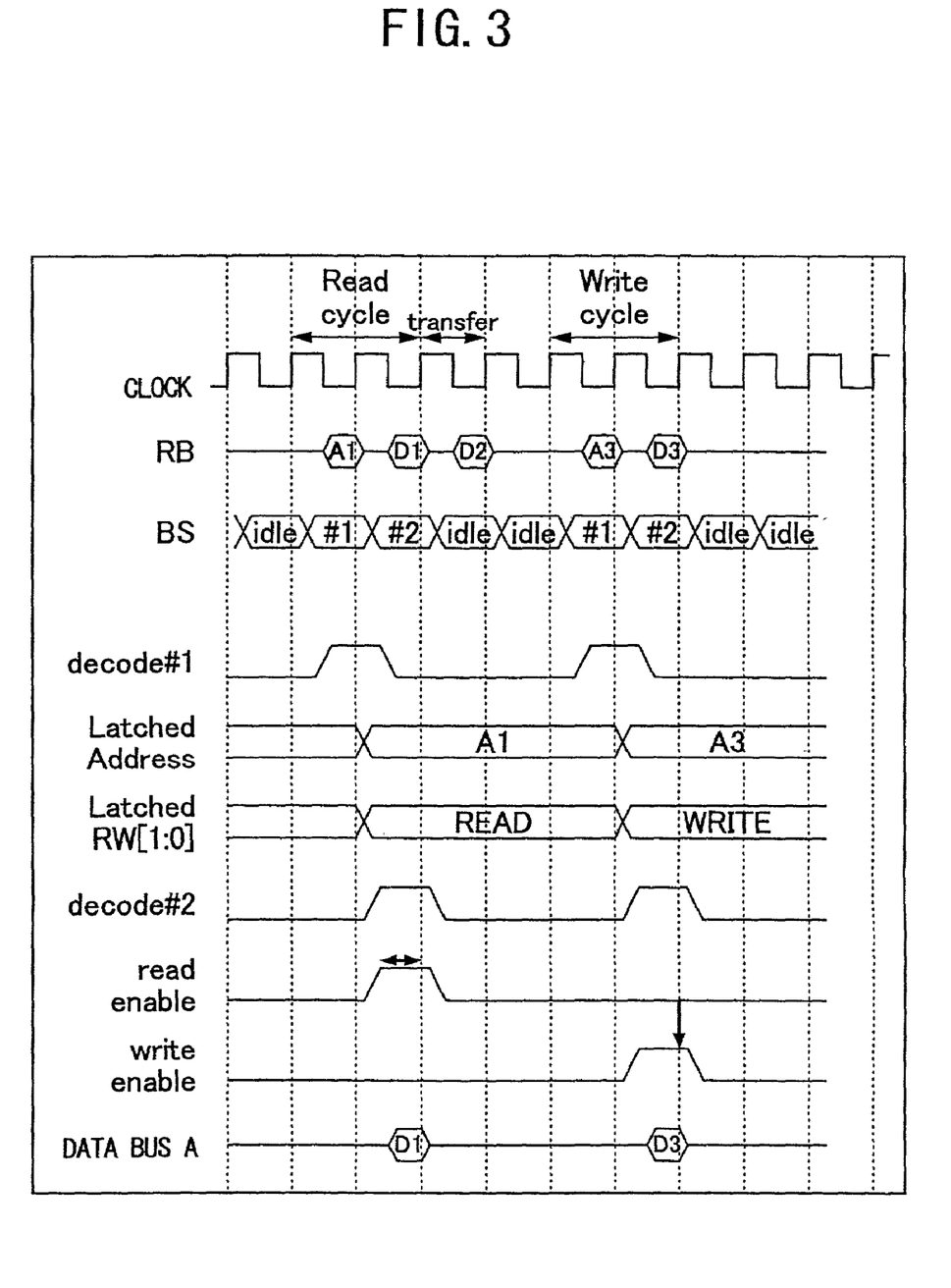
FIG. 3 is a timing chart illustrating the timing of bus operations that represent the principal operations in accordance with the present invention.

FIG. 3 is a timing chart illustrating the timing of bus operations that represents the principal operations in accordance with the present invention.

Address information and data information are transferred through the address/data bus 22 that is time-shared. For instance, a 16-bit width signal RB[15:0] is transferred through the address/data bus 22. A 2-bit bus control signal BS[1:0] that represents the type of the bus cycle ("IDLE", "#1", "#2", for instance) of the address/data bus 22 is transferred through the control signal line 29. In accordance with the status of the bus control signal BS transferred through the control signal line 29, the bus control unit 21 controls the time-shared address/data bus 22. By doing so, the access to the function blocks can be completed in 2 clock cycles.

In FIG. 3, the address/data bus 22 is denoted by RB, and the control signal line 29 is denoted by BS. The first access represents a read operation intended for the function block 23A, and the second access represents a write operation intended for the function block 23A. The following is a description of the bus operation, with reference to FIG. 3.

1) IDLE Cycle:

The IDLE cycle is a state where no access request is transmitted. In this state, the bus control unit 21 puts the address/data bus 22 into a high-impedance state.

2) First Cycle(#1):

The bus division control unit 26 decodes the 2-bit bus control signal BS so as to generate a decoded signal "decode #1" that indicates the first cycle. In accordance with this decoded signal, a control operation for the first cycle is performed.

During the first cycle(#1), the bus control unit 21 outputs address information and read/write information to the address/data bus 22. The latch/decoder unit 31 uses RB[15] and RB[12:0] of the first cycle as an address, and RB[14] and RB[13] as read/write information, for instance. At the first access shown in FIG. 3, the latch/decoder unit 31 latches an address A1 and a signal "READ". At the next access, the latch/decoder unit 31 latches an address A3 and a signal "WRITE".

3) Second Cycle(#2):

The bus division control unit 26 decodes the 2-bit control signal BS, so as to generate a decoded signal "decode #2"

that indicates the second cycle. In accordance with the decoded signal, a control operation for the second cycle is performed.

In this second cycle(#2), the latch/decoder unit 31 decodes the information latched in the first cycle. If the bus cycle is determined to be a READ cycle (where the bus cycle is the first access shown in FIG. 3), the latch/decoder unit 31 of the bus division control unit 26 sends a read-enable signal to the function block 23A via the control signal line 24A. The function block 23A in turn outputs data D1 onto the data bus 25A during a subsequent low clock period. At this point, based on the decoded result of the address information, the data bus 25A is connected to the address/data bus 22 via the bus dividing unit 32 in the direction of read access. Accordingly, the read data D1 appears on the address/data bus 22, and, at the next rising edge of the clock, the bus control unit 21 obtains the data D1 of RB[15:0] from the address/data bus 22.

If the bus cycle is determined to be a WRITE cycle (where the bus cycle is the second access in FIG. 3), the bus control unit 21 outputs data D3 onto the address/data bus 22 during a subsequent low clock period. At this point, in accordance with the decoded result of the address information, the data bus 25A is connected to the address/data bus 22 via the bus dividing unit 32 in the direction of write access. Accordingly, the data D3 appears on the data bus 25A via the bus dividing unit 32. The latch/decoder unit 31 of the bus division control unit 26 sends a write-enable signal to the function block 23A through the control signal line 24A. At the next rising edge of the clock, the function block 23A obtains the data D3 from the data bus 25A.

Likewise, in the case of requesting an access to any of the other function blocks 23B, 23C, and 23D, the bus division control unit 26 latches the data of RB[15:0] in the first cycle, and decodes the latched data in the second cycle. In accordance with the decoded read/write information, the bus division control unit 26 asserts a control signal to the addressed function block according to the decoded address information. At the same time, the bus division control unit 26 connects the corresponding data bus to the address/data bus 22, in accordance with the decoded address information.

Figure 4:
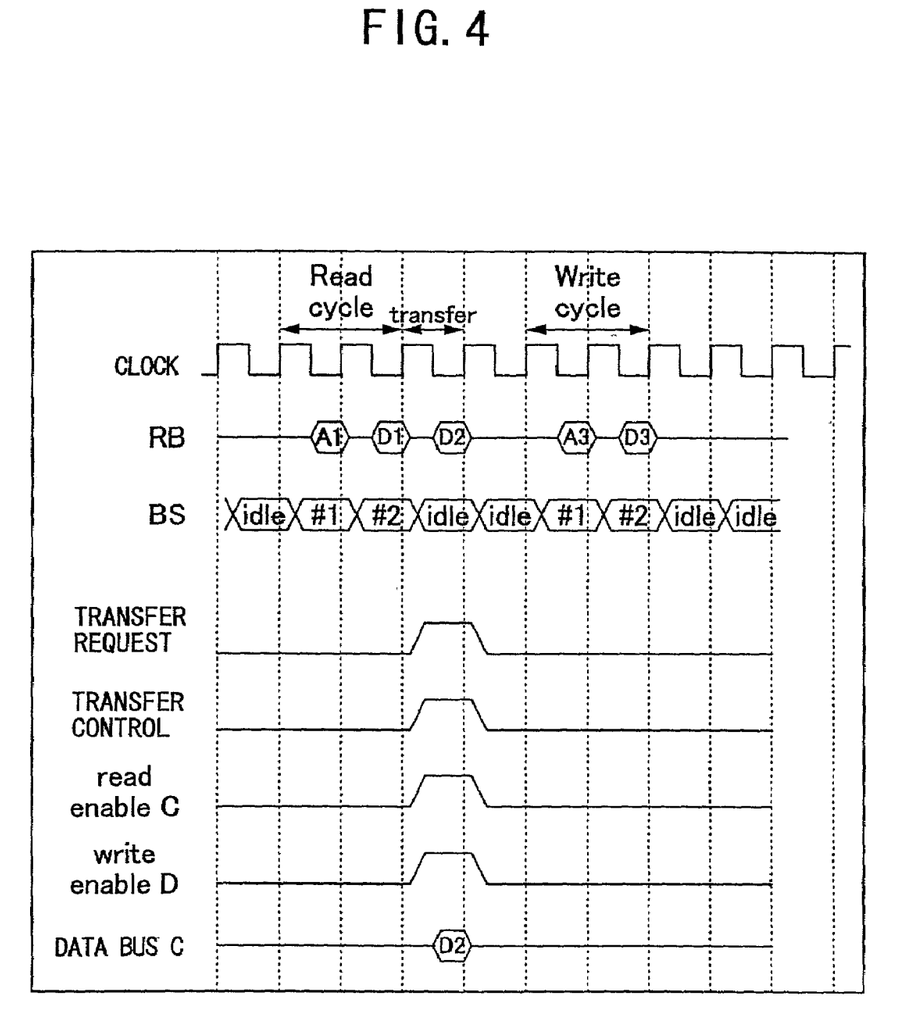
FIG. 4 is a timing chart illustrating the timing of bus operations where data is transferred between function blocks according to the present invention.

FIG. 4 is a timing chart illustrating the timing in bus operations, where data is transferred between two of the function blocks.

Where a transfer request signal is to be sent through the transfer request signal line 27, a transfer direction, that is, a transfer destination and a transfer origin, is determined. For instance, a read-enable signal C is transmitted from the bus division control unit 26 to the function block 23C via the control signal line 24C, and a write-enable signal D is transmitted from the bus division control unit 26 to the function block 23D via the control signal line 24D. In return, the function block 23C outputs data D2 onto the data bus 25C. The function block 23D then obtains the data D2 from the data bus 25C at the next rising edge of the clock. In this manner, a data transferring operation between the function block 23C and 23D can be completed by only one access.

While data is being transferred between the function blocks 23C and 23D, another access from the bus control unit 21 to the function block 23A or 23B can be made independently of the data transferring operation between the function blocks 23C and 23D. If the data bus 25C is occupied when a transfer request signal is asserted through the transfer request signal line 27, the data transferring operation between the function blocks 23C and 23D can wait until the data bus 25C becomes available.

On the other hand, once the transfer request signal is removed from the transfer request signal line 27, the data bus 25C is released. If an access request to the data bus 25C is made by the bus control unit 21 while a transfer request signal is being asserted through the transfer request signal line 27, priority will be given to the regular access request made from the bus control unit 21. Accordingly, the transfer request becomes idle and waits for the data bus 25C to become available.

Figure 5:
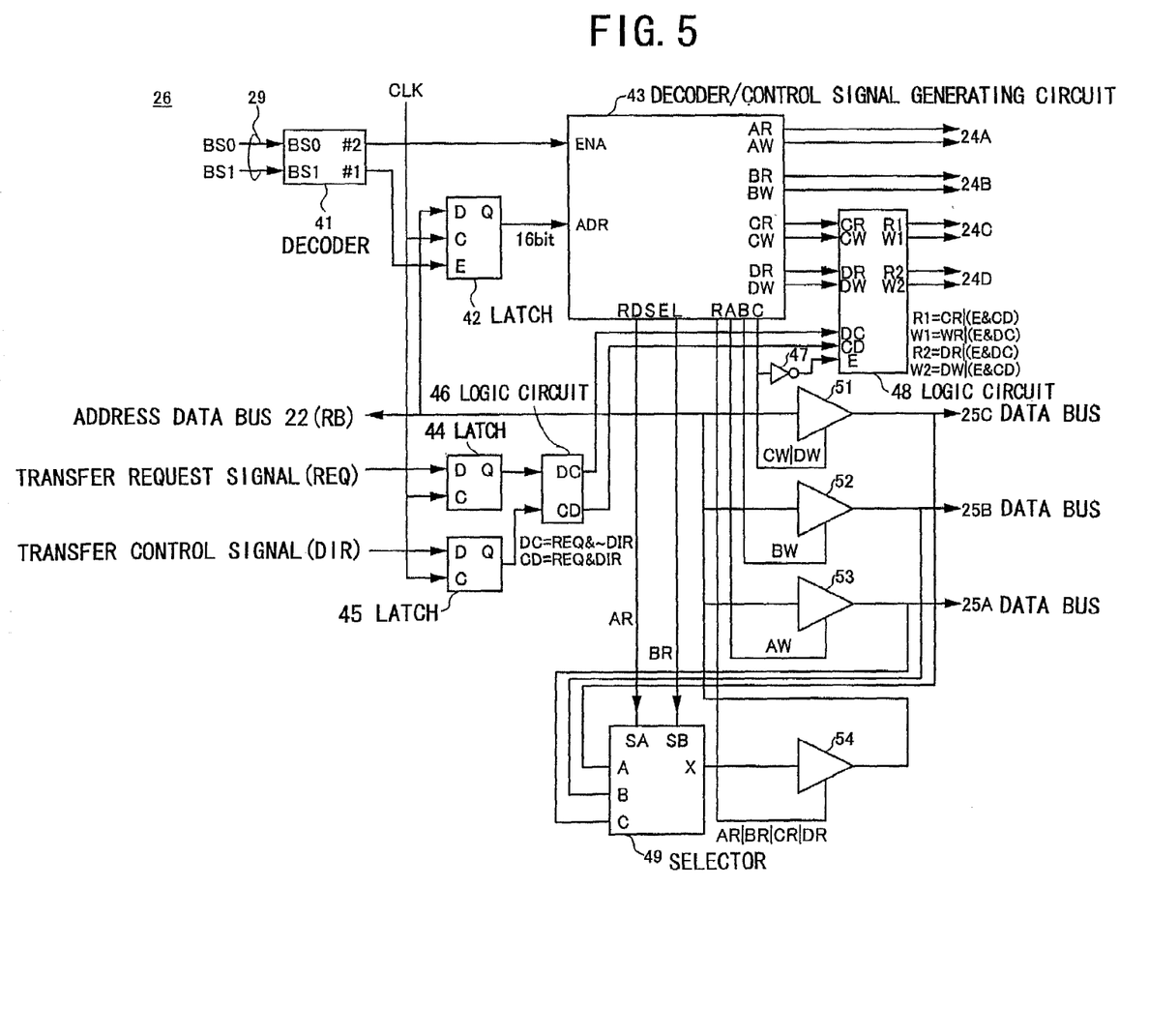
FIG. 5 is a circuit diagram showing a detailed structure of a bus division control unit in accordance with the present invention.

FIG. 5 is a circuit diagram illustrating the structure of the bus division control unit 26.

The bus division control unit 26 shown in FIG. 5 includes a decoder 41, a latch 42, a decoder/control signal generating circuit 43, a latch 44, a latch 45, a logic circuit 46, an inverter 47, a logic circuit 48, a selector 49, and bus drivers 51 through 54. The latch decoder 31 shown in FIG. 2 corresponds to the decoder 41, the latch 42, the decoder/control signal generating circuit 43, the latch 44, the latch 45, the logic circuit 46, the inverter 47, the logic circuit 48. The bus dividing unit 32 corresponds to the selector 49 and the bus drivers 51 through 54. In FIG. 5, the main signals are accompanied by logical equations.

The decoder 41 receives signals BS0 and BS1 directed to the address/data bus 22 via the control signal line 29, and decodes these signals. If the signals BS0 and BS1 represent an address cycle, the decoder 41 determines a signal #1 to be transmitted. If the signals BS0 and BS1 represent a data cycle, the decoder 41 determines a signal #2 to be transmitted. The signal #1 is sent as an enable signal to the latch 42. The signal #2 is sent as an enable signal to the decoder/control signal generating circuit 43.

The latch 42 is enabled during an address cycle, and latches address information supplied from the address/data bus 22 in synchronization with a clock signal CLK. The latched address signal (consisting of 16 bits, for instance) is then sent from the latch 42 to the decoder/control signal generating circuit 43.

On the other hand, the decoder/control signal generating circuit 43 is enabled during a data cycle, and generating various control signals, based on the decoded results of addresses supplied from the address/data bus 22. The control signals are partly sent through the control signal lines 24A through 24D corresponding to the function blocks 23A through 23D. Here, a read operation or a write operation, whichever is determined by a part of the address signal, is performed on a function block selected by the address signal. The control signals corresponding to the control signal lines 24C and 24D are supplied to the control signal lines 24C and 24D after passing through the logic circuit 48. When data is transferred between the function blocks 23C and 23D, the logic circuit 48 generates control signals to be transmitted through the control signal lines 24C and 24D, independently of the decoder/control signal generating circuit 43.

The control signals generated from the decoder/control signal generating circuit 43 are partly sent to the bus drivers 51, 52 and 53. If a write access is made in accordance with the supplied control signals, one of the bus drivers 51, 52 and 53 is selectively activated. At this point, one of the data buses 25A, 25B and 25C is selectively connected to the address/data bus 22, so that a write access from the address/data bus 22 to the selected data bus can be successfully performed.

The control signals generated from the decoder/control signal generating circuit 43 are also partly sent to the selector 49 and the bus driver 54. In accordance with the supplied control signal, the selector 49 selects one of the data buses 25A, 25B and 25C, which is then connected to the bus driver 54. The bus driver 54 is activated when a read access is made, and connects the selected data bus to the address/data bus 22. In this manner, read data can be transferred from the selected data bus to the address/data bus 22.

The latch 44 lathes a transfer request signal transmitted through the transfer request signal line 27 in synchronization with the clock signal CLK. The latch 45 latches a transfer control signal transmitted through the transfer control signal line 28 in synchronization with the clock signal CLK. The signals latched by the latches 44 and 45 are then supplied to the logic circuit 46. Where a transfer request has been made (i.e., the transfer request signal line 27 is high) and the transfer control signal line 28 is high, the logic circuit 46 turns a signal CD for the logic circuit 48 high. Where a transfer request has been made (i.e., the transfer request signal line 27 is high) and the transfer control signal line 28 is low, the logic circuit 46 turns a signal DC for logic circuit 48 high. By turning either the signal CD or signal DC high, the transfer origin and the transfer destination are determined between the function blocks 23C and 23D.

As described above, the logic circuit 48 receives signals CR, CW, DR, and DW for the control signal lines 24C and 24D from the decoder/control signal generating circuit 43, as well as the signals CD and DC from the logic circuit 46. The logic circuit 48 further receives an inverted signal of a signal generated from the decoder/control signal generating circuit 43 via the inverter 47, which signal becomes high when the data bus 25C is selected. Accordingly, when the data bus 25C is selected, the signals CD and DC supplied from the logic circuit 46 are ignored, and the signals CR, CW, DR, and DW supplied from the decoder/control signal generating circuit 43 are sent to the control signal lines 24C and 24D, instead. Here, the signals CR and CW correspond to a read-enable signal and a write-enable signal, respectively, for the function block 23C. Accordingly, a control operation is performed in accordance with an instruction from the decoder/control signal generating circuit 43 when the data bus 25C is selected, regardless of whether a data transfer request has been made through the transfer request signal line 27.

Where the data bus 25C is not selected and a data transfer request has been made through the transfer request signal line 27, the logic circuit 48 supplies control signals for designating a transfer origin and a transfer destination to control signal lines 24C and 24D in accordance with the signals CD and DC supplied from the logic circuit 46. By doing so, a data transferring operation between the function blocks 23C and 23D can be performed. Here, the bus driver 51 is not selected, and the data supplied through the address/data bus 22 has no adverse influence on the data bus 25C, which is transferring data between the function blocks 23C and 23D. In this embodiment, while data is being transferred between the function blocks 23C and 23D, an access can be made from the bus control unit 21 to the function blocks 23A or 23B.

Figure 6:
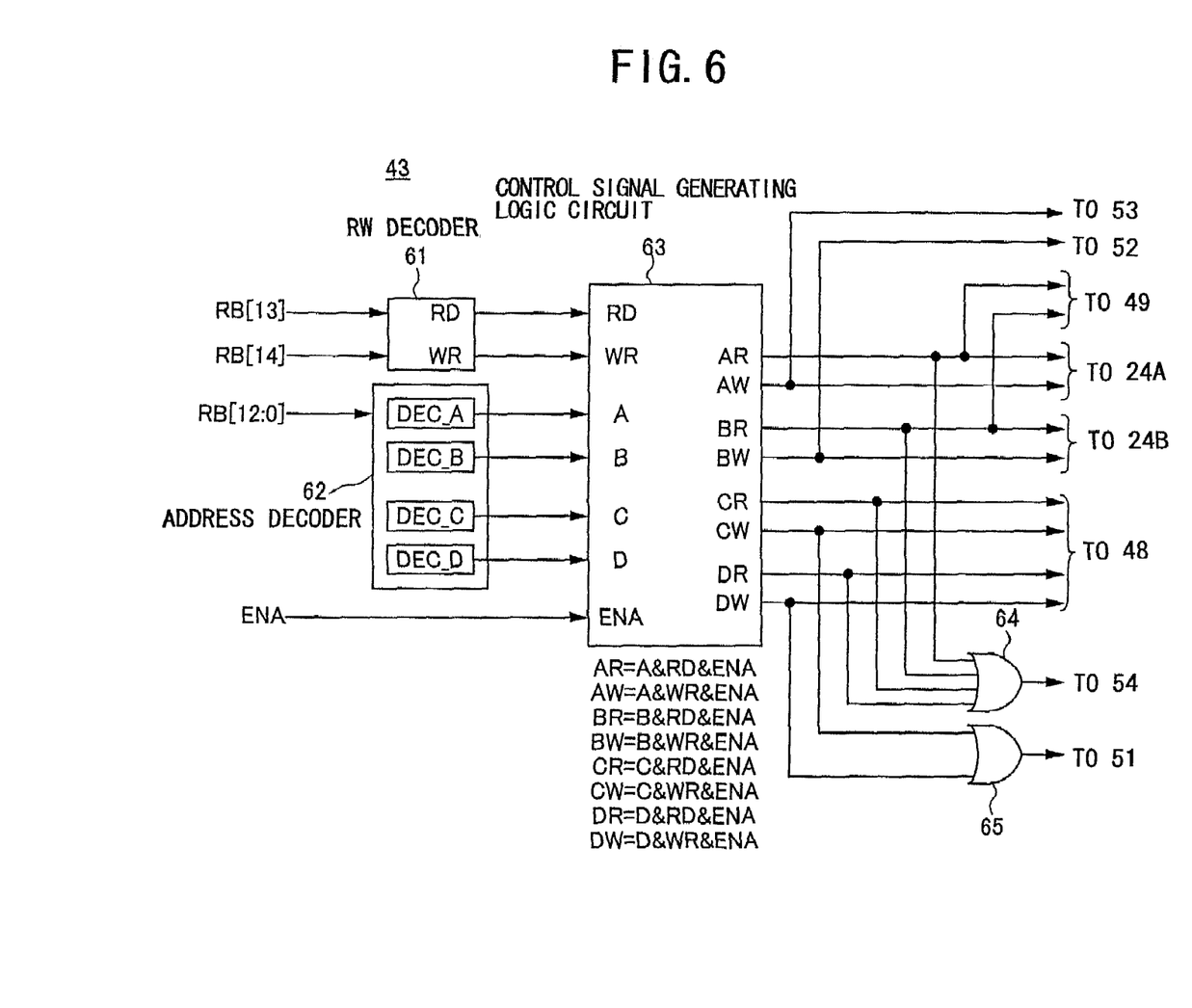
FIG. 6 is a circuit diagram of a decoder/control signal generating circuit in accordance with the present invention.

FIG. 6 is a circuit diagram of the decoder/control signal generating circuit 43.

The decoder/control signal generating circuit 43 includes an RW decoder 61, an address decoder 62, a control signal generating logic circuit 63, and OR circuits 64 and 65.

The RW decoder 61 selectively receives the address bits representing read and write (RB[14] and RB[13] in FIG. 6) out of the 16-bit address signal supplied from the latch 42. By decoding these address bits, the RW decoder 61 generates a read signal RD to command a read operation and a write signal WR to command a write operation. The read signal RD and the write signal WR are then supplied to the control signal generating logic circuit 63.

The address decoder 62 receives the address bit representing the address (RB[12:0] in FIG. 6) out of the 16-bit address signal supplied from the latch 42. By decoding this address bit, the address decoder 62 generates decode signals A, B, C and D for the function blocks 23A through 23D. Among the decoded signals A through D, the one corresponding to the selected function block becomes high. The decoded signals A through D are then supplied to the control signal generating logic circuit 63.

The control signal generating logic circuit 63 is activated when an enable signal ENA supplied from the decoder 41 is confirmed. The control signal generating logic circuit 63 then performs the predetermined logical operations shown in FIG. 6, so as to output control signals AR, AW, BR, BW, CR, CW, DR and DW. The control signals AR and AW command read and write operations of the function block 23A. The control signals BR and BW command read and write operations of the function block 23B. The control signals CR and CW command read and write operations of the function block 23C. The control signals DR and DW command read and write operations of the function block 23D.

The OR circuit 64 ORs among the control signals AR, BR, CR and DR, and generates a signal to command a read access. This signal is then supplied to the bus driver 54. In response to this signal, the bus driver 54 operates and connects the bus in the read direction. The OR circuit 65 ORs between the control signals CW and DW, and generates a signal to command a write access to the function blocks 23C and 23D. This signal is then supplied to the bus driver 51. In response to this signal, the bus driver 51 connects the data bus 25C to the address/data bus 22 in the write direction. Also, as shown in FIG. 6, the control signals AW and BW are supplied to the bus drivers 53 and 52, respectively. In response to this, the corresponding buses are connected to the address/data bus 22 in the write direction.

Although multiplex buses that transfer addresses and data in a time-sharing manner are employed in the above embodiment, it is also possible to provide an address bus and a data bus separately. It should be noted that the present invention is not limited to the embodiments specifically disclosed above, but other variations and modifications may be made without departing from the scope-of the present invention.

What is claimed is:

1. A semiconductor device comprising:
   a plurality of function blocks;
   a plurality of buses, each of which is respectively connected to one of the plurality of function blocks;
   a plurality of control signal lines, which are separate from each other and are electrically connected to the respective function blocks;
   a main bus;
   a bus control unit connected to the main bus; and
   a bus division control unit located between the plurality of buses and the main bus, configured to couple one of the plurality of buses to the main bus and to transmit a control signal indicative of a write operation or a read operation to a corresponding one of the plurality of control signal lines in response to a decoded result of address information supplied from the bus control unit via the main bus, thereby controlling a corresponding one of the plurality of function blocks, wherein one control signal line is not connected to two or more function blocks.

2. The semiconductor device as claimed in claim 1, wherein the bus division control unit comprises:
- a decoder unit for decoding the information supplied from the bus control unit via the main bus and generating the control signal; and
- a bus dividing unit for connecting one of the plurality of buses to the main bus, in accordance with a decoded result of the decoder unit.

3. The semiconductor device as claimed in claim 1, wherein the bus division control unit connects one of the plurality of buses to the main bus, in accordance with a decoded result of address information transmitted from the bus control unit via the main bus.

4. The semiconductor device as claimed in claim 1, wherein
- at least two of the plurality of function blocks shares one of the plurality of buses, and
- the bus division control unit controls a transfer operation between the two function blocks via the one of the plurality of buses in response to a transfer request signal.

5. The semiconductor device as claimed in claim 4, wherein the bus division control unit simultaneously transmits a write-enable signal to one of the two function blocks and a read-enable signal to the other one of the two function blocks.

6. The semiconductor device as claimed in claim 4, wherein the bus division control unit receives a transfer control signal and determines a transfer source and a transfer destination between the two function blocks in accordance with the transfer control signal.

7. The semiconductor device as claimed in claim 4, wherein, when an access request to one of the two function blocks is made by the bus control unit, the bus division control unit processes the access request prior to processing the transfer request.

8. The semiconductor device as claimed in claim 4, wherein, when an access request to one of the plurality of function blocks other than the two function blocks is made by the bus control unit, the bus division control unit processes the access request in parallel with processing the transfer request.

9. The semiconductor device as claimed in claim 1, wherein the bus division control unit determines whether an access made by the bus control unit is a read access or a write access based on a decoded result of information supplied from the bus control unit via the main bus, and connects one of the plurality of buses to the main bus in the access direction as determined based on the decoded result of information supplied from the bus control unit via the main bus.

10. A semiconductor device comprising:
- a plurality of function blocks;
- a plurality of data buses, each connected to one of the plurality of function blocks;
- a plurality of control signal lines, each electrically connected to a corresponding one of the plurality of function blocks;
- an address/data bus having a main control signal line;
- a bus control unit connected to the address/data bus; and
- a bus division control unit arranged to decode address information received from the bus control unit via the address/data bus, couple the address/data bus to the plurality of data buses, and transmit a control signal indicative of a write operation or a read operation from the main control signal line via one of the plurality of control signal lines to control the corresponding one of the plurality of function blocks, wherein one control signal line is not connected to two or more function blocks.

11. A semiconductor device comprising:
- a plurality of function blocks;
- a plurality of buses, each of which is respectively connected to one of the plurality of function blocks;
- a plurality of control signal lines, each of which is respectively electrically connected to one of the plurality of function blocks;
- a main bus;
- a bus control unit connected to the main bus; and
- a bus division control unit located between the plurality of buses and the main bus, for connecting a first bus of the plurality of buses to the main bus to transmit a control signal to a corresponding one of the plurality of control signal lines in accordance with a decoded result of information on the main bus, and controlling a transferring operation between two function blocks connected to a vacant shared second bus of the plurality of buses, and wherein the two function blocks are selected, and a one-to-one correspondence of each sender function block to a corresponding recipient function block provides a unidirectional bus configuration in which one transferring operation is accomplished in a single cycle, a bus load is minimized, and one of the plurality of function blocks is controlled wherein one control signal line is not connected to two or more function blocks.

* * * * *